(12) United States Patent
Hineno et al.

(10) Patent No.: US 8,337,187 B2
(45) Date of Patent: Dec. 25, 2012

(54) TIRE HOLDING MECHANISM AND POST CURE INFLATOR

(75) Inventors: Yoshikatsu Hineno, Hiroshima (JP); Toshifumi Murakami, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 122 days.

(21) Appl. No.: 12/318,080

(22) Filed: Dec. 22, 2008

(65) Prior Publication Data
US 2009/0311355 A1 Dec. 17, 2009

(30) Foreign Application Priority Data
Jun. 13, 2008 (JP) ................................. 2008-155375

(51) Int. Cl.
*B29C 35/16* (2006.01)
(52) U.S. Cl. ........................................ 425/38; 425/58.1
(58) Field of Classification Search ...................... 425/38, 425/58.1
See application file for complete search history.

(56) References Cited

U.S. PATENT DOCUMENTS

| | | | |
|---|---|---|---|
| 3,195,179 A * | 7/1965 | Laube ........................... | 425/58.1 |
| 4,092,090 A * | 5/1978 | Yuhas et al. ................. | 425/58.1 |
| 4,944,951 A * | 7/1990 | Katayama et al. ........... | 425/58.1 |
| 5,352,104 A | 10/1994 | Ichikawa et al. | |
| 5,770,236 A * | 6/1998 | Ureshino et al. ............. | 425/58.1 |
| 6,241,501 B1 * | 6/2001 | Mitamura ..................... | 425/58.1 |
| 6,890,165 B2 * | 5/2005 | Ichimaru ...................... | 425/58.1 |
| 7,001,164 B2 * | 2/2006 | Ichimaru ...................... | 425/58.1 |
| 2004/0013755 A1 | 1/2004 | Ichimaru | |

FOREIGN PATENT DOCUMENTS

| | | |
|---|---|---|
| CN | 1436116 A | 8/2003 |
| JP | H01-154714 A | 6/1989 |
| JP | 5-131462 * | 5/1993 |
| JP | H09-131737 | 5/1997 |
| JP | 2001-030256 | 2/2001 |

* cited by examiner

*Primary Examiner* — James Mackey
(74) *Attorney, Agent, or Firm* — Manabu Kanesaka; Kenneth M. Berner; Benjamin J. Hauptman

(57) ABSTRACT

A tire holding mechanism includes a first support body, a second support body and a moving device. The first support body is provided with a substantially annular first flange which supports a first bead at one side of the tire, a lock shaft having a lock mechanism and which protrudes in an axial direction of the first flange to allow the first flange to move in the axial direction, and a stopper which restrains the first flange at the proximal end of the lock shaft. The second support body is provided with a substantially annular second flange which supports a second bead of the tire, and an engagement portion with which the lock mechanism is removably engaged. The moving device moves the first support body between a tire holding position and a tire transferring position. The lock mechanism is engaged with the engagement portion at the tire holding position.

6 Claims, 9 Drawing Sheets

TIRE HOLDING MECHANISM AND POST CURE INFLATOR

CROSS-REFERENCE TO RELATED APPLICATIONS

Priority is claimed on Japanese Patent Application No. 2008-155375, filed Jun. 13, 2008, the content of which is incorporated herein by reference.

BACKGROUND OF THE INVENTION

1. Field of the Invention

The present invention relates to a tire holding mechanism which holds a tire and which transfers the tire to/from other equipments, and to a post cure inflator having the tire holding mechanism which cools vulcanized tires.

2. Description of Related Art

A tire is vulcanized by treating an unvulcanized tire in molds included in a vulcanizer while maintaining inside the molds at prescribed pressure and temperature. Since the tire immediately after vulcanization is hot and soft, the tire may deform due to its own weight. Further, the tire may contract with cooling. Therefore, some vulcanizers are provided with a post cure inflator. The post cure inflator performs the cooling of the tire immediately after vulcanization while maintaining the shape of the tire (that is, inflation treatment). Conventionally, a loader is disposed between the vulcanizer and the post cure inflator. The tire immediately after vulcanization is transferred from the vulcanizer to the post cure inflator by the loader.

Specially, the post cure inflator is provided with an outside rim attachment flange (that is, first flange) which supports a first bead at one side of the vulcanized tire via an outside rim, and an inside rim attachment flange (that is, second flange) which supports a second bead at the other side of the vulcanized tire via an inside rim. A lock shaft is inserted into a core cylinder (that is, engagement portion) to which the inside rim attachment flange is attached. The lock shaft is allowed to protrude after the outside rim attachment flange is attached thereto. Engagement projections formed at an inner circumference surface of the core cylinder are engaged with lock projections formed at an outer circumference surface of the lock shaft, and thereby the outside rim attachment flange is joined with the inside rim attachment flange. Therefore, the vulcanized tire is held between the flanges.

The outside rim attachment flange and the lock shaft are moved by a moving device, and then the vulcanized tire is put on the inside rim attachment flange by the loader. Subsequently, the outside rim attachment flange and the lock shaft are returned to the initial position by the loader, and then the engagement projections are engaged with the lock projections. Therefore, the vulcanized tire is reliably held between the flanges at a desired width dimension. Thereafter, the vulcanized tire is inflated.

When the width dimension of the tire to be produced is changed, the core cylinder to which the inside rim attachment flange is attached is shifted in an axial direction of the core cylinder, and thereby the distance between the outside and inside rim attachment flanges in condition that the engagement projections are engaged with the lock projections of the lock shaft is adjusted (for example, refer to Japanese Patent No. 2,670,251).

In a system including the vulcanizer and the post cure inflator, the loader must be disposed between the vulcanizer and the post cure inflator. Therefore, space for disposing the loader is needed in the system. In order to perform transfer of the tire between the vulcanizer and the post cure inflator, the vulcanizer must be provided with an escape space for the mold. In addition, the post cure inflator must be provided with another escapespace for the outside rim attachment flange and the lock shaft.

There is a post cure inflator including the vulcanized tire holding mechanism provided with a function for receiving the vulcanized tire (refer to Japanese Patent No. 4045053). Specially, the post cure inflator has a tire moving apparatus. The tire moving apparatus includes a connection device to which an outside rim attachment flange with a rim mold is removably connected, and a rotation arm whose distal end is provided with the connection device. As shown in FIG. 9, the outside rim attachment flange is connected to the connection device, and the rotation arm is rotated to move the outside rim attachment flange, and thereby a vulcanized tire 202A accommodated in a mold 201 of the vulcanizer can be received. After receiving the vulcanized tire 202A, the rotation arm is rotated to move the outside rim attachment flange again, and thereby the outside rim attachment flange is joined with an inside rim attachment flange. Therefore, the vulcanized tire is held between the flanges, and is inflated. Since this post cure inflator can receive the vulcanized tire by moving the outside rim attachment flange, the post cure inflator does not include a loader.

As shown in FIG. 9, in the post cure inflator disclosed in Japanese Patent No. 4045053, in a case where the width dimension of the tire to be produced is small, a lock shaft 203 interferes with a bottom surface 201a of a mold 201 and a center mechanism (not shown) arranged at a center of the mold while receiving the vulcanized tire 202B in the mold 201. Although the length of the lock shaft 203 may be arranged in accordance with a narrow width tire, an engagement portion to which the inside rim attachment flange is attached must be projected in advance. Also, in a case where the width dimension of the tire to be produced is large, the engagement portion must be projected. As a result, it is difficult to avoid the size of the post cure inflator from being enlarged.

The present invention has been conceived of in order to solve the above described problem, and it provides a tire holding mechanism and a post cure inflator. The tire holding mechanism included in the post cure inflator can smoothly transfer a tire to/from other equipments regardless of the size of a width of the tire, and can reliably hold the tire while maintaining the desired width of the tire.

SUMMARY OF THE INVENTION

A tire holding mechanism of the present invention holds a tire and transfers the tire to/from other equipments. The tire holding mechanism includes a first support body, a second support body and a moving device. The first support body is provided with a substantially annular first flange which supports a first bead at one side of the tire, a lock shaft having a lock mechanism and protruding in an axial direction of the first flange to allow the first flange to move in the axial direction, and a stopper which restrains the first flange at the proximal end of the lock shaft. The second support body is provided with a substantially annular second flange which supports a second bead at the other side of the tire, and an engagement portion with which the lock mechanism is removably engaged. The moving device moves the first support body between a tire holding position and a tire transferring position. The lock mechanism is engaged with the engagement portion at the tire holding position.

According to the tire holding mechanism of the present invention, it is possible to transfer the tire to/from the other equipments by moving the first support body using the moving device to the tire transferring position. By moving the first flange of the first support body toward the distal end of the lock shaft, the length of the lock shaft protruding from the first flange can be decreased. Therefore, the first flange can reliably support the first bead of the tire at the tire transferring position, while maintaining the insertion amount of the lock shaft into the center of the tire to minimal. As a result, it is possible to transfer the tire to/from the other equipments without interference of the lock shaft.

In addition, when the tire is held, by moving the first flange of the first support body toward the proximal end of the lock shaft while with moving the first support body using the moving device to the tire holding position, the length of the lock shaft protruding from the first flange can be increased. By engaging the lock mechanism of the lock shaft with the engagement portion, the first support body is joined with the second support body. Therefore, the tire can be held between the first and second flanges. The first flange is restrained by the stopper. The tire can be reliably held in the size of the width equivalent to the distance between the first and second flanges.

In the tire holding mechanism of the present invention, the first support body may be provided with hooking members so that the hooking members located closer to the distal end of the lock shaft than the first flange. The hooking members are movable in a radial direction of the lock shaft to fit the tire with the first flange.

According to the constitution as above, the hooking members are moved inward in the radial direction, and thereafter the first flange of the first support body can support one of the beads of the tire along with leading the lock shaft toward the center of the tire at a tire transferring position. While maintaining this condition, the hooking members are moved outward in the radial direction, and thereby the hooking members hook one of the beads of the tire supported by the first flange. Therefore, the tire can be reliably transferred from the other equipments at the tire transferring position.

The tire holding mechanism of the present invention may include an engagement switching device which allows the lock mechanism to engage with the engagement portion. The hooking members can be moved in the radial direction of the lock shaft by the engagement switching device.

According to the constitution as above, the lock mechanism of the lock shaft is engaged with the engagement portion by the switching device, and thereby the first support body can be joined with the second support body at a tire holding position. Further, the hooking members are moved by the switching device, and thereby the tire can be hooked at the tire transferring position. As mentioned above, since the first support body can be removably joined with the second support body and the hooking members can be moved by the switching device, it is unnecessary to provide any device for moving the hooking members. As a result, the mechanism can reliably receive the tire. In addition, the size of the mechanism can be reduced, and a reduction in cost can be achieved.

A post cure inflator of the resent invention includes the above mentioned tire holding mechanism. The post cure inflator cools the vulcanized tire while holding the vulcanized tire between the first and second support bodies.

According to the constitution as above, the post cure inflator can hold the vulcanized tire received from the vulcanizer using the tire holding mechanism, and can inflate the tire. After inflating the tire, the post cure inflator can transfer the tire to the other equipments.

According to the tire holding mechanism of the present invention, the first flange is movable in an axial direction of the lock shaft, and the first support body has a stopper. Therefore, the tire holding mechanism can smoothly transfer the tire and reliably hold it regardless of the size of the width of the tire.

According to the post cure inflator of the present invention, it is possible to reliably hold and inflate the tire. Further, the post cure inflator can transfer the tire to/from the other equipments without providing any other device for transferring. As a result, an area occupied by the post cure inflator can be reduced, and a reduction in cost can be achieved.

BRIEF DESCRIPTION OF THE INVENTION

DESCRIPTION OF THE PREFERRED EMBODIMENTS

An embodiment of the present invention will be explained below refer to FIG. 1 to FIG. 8.

Figure 1:
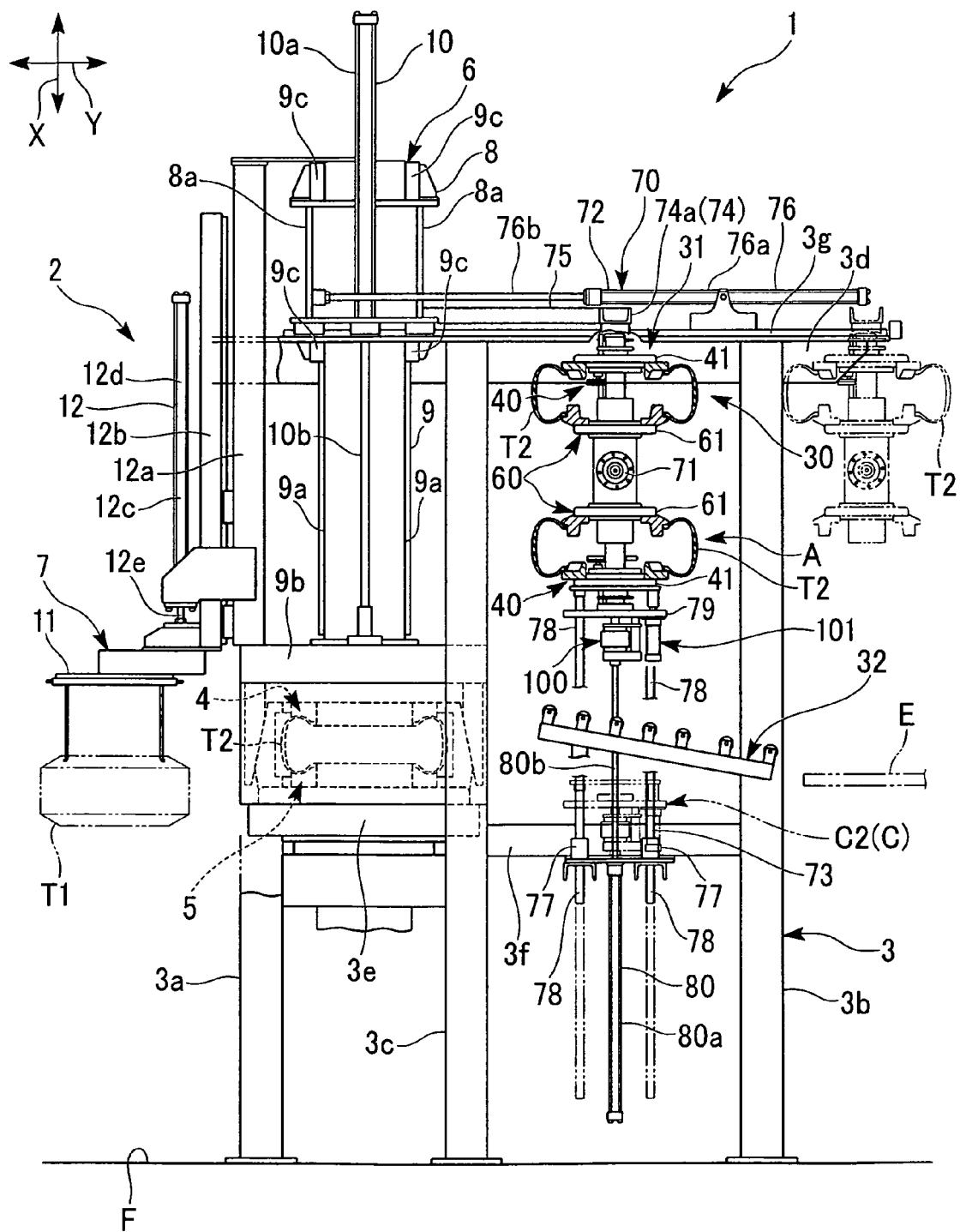
FIG. 1 is a view showing the embodiment of the vulcanizer of the present invention.

As sown in FIG. 1, a vulcanizer 1 of this embodiment includes a vulcanizer main body 2 which vulcanizes an unvulcanized tire T1 transferred from other equipments (not shown), and a post cure inflator (so called "PCI" below) 30 which inflates a vulcanized tire T2 by the vulcanizer main body 2. The vulcanizer main body 2 and the PCI 30 are disposed on a flat floor surface F adjacent to each other.

A frame set 3 includes three post members 3a, 3b and 3c, an upper beam member 3d arranged on the top ends of the post members 3a, 3b and 3c, a lower beam member 3e arranged between the post members 3a and 3c, and another lower beam member 3f arranged between the post members 3b and 3c. The lower beam member 3e supports a lower mold 5 of the vulcanizer main body 2 and the lower beam member 3f supports a second moving portion 3 of a moving device 70 included in the PCI 30.

The vulcanizer main body 2 includes an upper mold 4 and a lower mold 5 in which the unvulcanized tire T1 is accommodated, an elevation device 6 which moves the upper mold 4 in the vertical direction X, and a carry-in device 7 which carries the unvulcanized tire T1 into the vulcanizer main body 2 from the other equipments. The lower mold 5 is fixed to the lower beam member 3e.

The elevation device 6 includes an elevation guide portion 8, a mold support portion 9, and a mold driving portion 10 which moves the mold support portion 9 in the vertical direction X. The elevation guide portion 8 is supported by a guide member 3g of the frame set 3, and is allowed to move in the horizontal direction Y. The mold support portion 9 is supported by the elevation guide portion 8, and is allowed to move in the vertical direction X. The mold support portion 9 includes a pair of elevation sliders 9a extending in the vertical direction X, and a mold support plate 9b. The upper mold 4 is attached to the mold support plate 9b. The elevation guide portion 8 includes a pair of elevation guide main bodies 8a standing on the guide member 3g, and four guide members 9c provided on the elevation guide main body 8a. Guide members 9c are respectively disposed on an upper end and a lower end of one of the elevation guide main bodies 8a, and also guide members 9c are respectively disposed on an upper end and a lower end of the other of the elevation guide main bodies 8a. The elevation sliders 9a are movable in the vertical direction X along the guide members 9c.

The mold driving portion 10 includes a cylinder 10a and a piston rod 10b. The cylinder 10a is supported by the elevation guide portion 8, and a lower end of the piston rod 10b is fixed to the mold support plate 9b. The piston rod 10b is movable in the vertical direction X. When the piston rod 10b is protruded from the cylinder 10a, the upper mold 4 is moved downward to contact the lower mold 5. When the piston rod 10b is retracted into the cylinder 10a, the upper mold 4 is moved upward to separate from the lower mold 5.

The carry-in device 7 includes a grasping portion 11 which grasps an unvulcanized tire T1, and a tire elevation portion 12 which moves the grasping portion 11 vertically. The tire elevation portion 12 includes a support member 12a, a slide member 12b and a driving portion 12c. The support member 12a stands on the mold support plate 9b of the mold support portion 9, and extends in the vertical direction X. The slide member 12b is supported by the support member 12a so as to be movable vertically. The grasping portion 11 is fixed to the slide member 12b.

The driving portion 12c includes a cylinder 12d and a piston rod 12e. The cylinder 12d is supported by the support member 12a, and a lower end of the piston rod 12e is fixed to the grasping portion 11. The piston rod 12e is movable in the vertical direction X. When the piston rod 12e is protruded from the cylinder 12d, the grasping portion 11 is moved downward to grasp the unvulcanized tire T1. When the piston rod 12e is retracted into the cylinder 12d, the unvulcanized tire T1 grasped by the grasping portion 11 is lifted.

The carry-in device 7 is supported by the elevation guide main bodies 8a of the elevation guide portion 8 of the elevation device 6 via the mold support portion 9. Further, the carry-in device 7 is movable in the horizontal direction Y by driving a first moving portion 72. The grasping portion 11 is movable in the vertical direction X by operating the driving portion 12c of the tire elevation portion 12. The carry-in device 7 can grasp the unvulcanized tire T1 carried-in from the other equipments at a position adjacent to the upper and lower molds 4 and 5 using the grasping portion 11, and to feed the unvulcanized tire T1 onto the lower mold 5.

The PCI 30 includes a tire holding mechanism 31 which holds a vulcanized tire T2 received from the vulcanizer main body 2, and a carry-out device 32 which carry-out the vulcanized tire T2 from the tire holding mechanism 31 after inflation treatment.

The carry-out device 32 is a conveyer sloping so as to descend toward the outside of the PCI 30, and guides the vulcanized tire T2 from the PCI 30 to a carry-out mechanism E. A hole (not shown) is formed in the middle of the carry-out device 32. A first support body 40 of the tire holding mechanism 31 is movable from downside of the carry-out device 32 to upside through the hole, and is movable from upside of the carry-out device 32 to downside through the hole.

The tire holding mechanism 31 includes the above mentioned first support body 40 having a first flange 41, a second support body 60 having a second flange 61, and the above mentioned moving device 70 which relatively-moves the first support body 40 with respect to the upper mold 4 and the second support body 60. The first flange 41 supports a first bead T2b at one side of the vulcanized tire T2 via an outside rim 91. The second flange 61 supports a second bead T2a at the other side of the vulcanized tire T2 via an inside rim 90 when the second flange 61 is connected to the first support body 40. The tire holding mechanism 31 has two pairs of the first support body 40 and the second support body 60. Thus, the tire holding mechanism 31 can hold two vulcanized tires T2 at one time.

The moving device 70 includes a rotation body 71, a first moving portion 72 and the above mentioned second moving portion 73. The second support bodies 60 are axisymmetrically fixed to the rotation body 71. The first moving portion 72 moves the vulcanizer main body 2 expecting the lower mold 5 and the rotation body 71 in the horizontal direction Y. Further, the first moving portion 72 moves the first support body 40 joining any one of the second support bodies 60, or the first support bodies 40 respectively joining the second support bodies 60 in the horizontal direction Y, as well as the second support bodies 60. The second moving portion 73 removably supports the first support bodies 40, and moves the first support body 40 in the vertical direction X.

The first moving portion 72 includes a slider 74, a connection member 75 and a first driving portion 76. The first slider 74 is moved in the horizontal direction Y along the upper beam member 3d by the guide member 3g disposed on the upper beam member 3d of the frame set 3. In addition, the first slider 74 includes a beam member 74a and a hanging member (not shown). The beam member 74a horizontally extends in a direction orthogonal to the upper beam member 3d, and moves in the horizontal direction Y along the upper beam member 3d. The hanging member extends downward from the beam member 74a, and supports the rotation body 71 to which the second support bodies 60 are attached so that the rotation body 71 is allowed to rotate around the horizontal axis. The hanging member is provided with a rotation driving portion. The rotation driving portion can rotate the rotation body 71 around the horizontal axis so as to turn the upside second support body 60 down and to turn the downside second support body 60 up. The connection member 75 connects the first slider 74 with the elevation guide portion 8.

The first driving portion 76 includes a cylinder 76a and a piston rod 76b. The cylinder 76a is supported by the upper beam member 3d, and the distal end of the piston rod 76b is fixed to the elevation guide main body 8a of the elevation guide portion 8. The piston rod 76b is movable in the horizontal direction Y.

When the piston rod 76b of the first driving portion 76 is moved, the elevation device 6 having the elevation guide portion 8, the upper mold 4, the carry-in device 7, the first slider 74 connected to the elevation guide portion 8 via the connection member 75, and the second support body 60 connected to the first slider 74 via the rotation body 71 move in the horizontal direction Y.

In addition, the second moving portion 73 includes guide members 77, second sliders 78, a support plate 79 and a second driving portion 80. The guide members 77 are fixed to the lower beam member 3f. The second sliders 78 are supported by the guide members 77 so as to be allowed to move in the vertical direction X. The support plate 79 supports the first support body 40. Through-holes 79a are formed in the support plate 79 (refer to FIG. 2), the second sliders 78 are passed through the holes 79a. Upper ends of the second sliders 78 passed through the holes 79a contact the first flange 41 of the first support body 40 supported by the support plate 79.

The second driving portion 80 includes a cylinder 80a and a piston rod 80b. The cylinder 80a is supported by the lower beam member 3f, and the upper end of the piston rod 80b is fixed to the support plate 79 via a switching device 100. The piston rod 80b is movable in the vertical direction X.

The piston rod 80b of the second driving portion 80 is moved, the support plate 79 and the first support body 40 supported by the support plate 79 move in the vertical direction X above the lower beam member 3f.

In the moving device 70, the positional relationship of the first support body 40, the second support body 60, and the upper mold 4 can be adjusted by coordinately-operating the first and second moving portions 72 and 73. That is, the first moving portion 72 moves the second support body 60 so that the second support body 60 faces the first support body 40 in the vertical direction X, and the second moving portion 73 moves the first support body 40 upward. Therefore, the first support body 40 is positioned at a tire holding position A where the first support body 40 is connected to the second support body 60.

The first moving portion 72 moves the upper mold 4 so that the upper mold 4 faces the first support body 40 in the vertical direction X, and the second moving portion 73 moves the first support body 40 upward. Therefore, the upper mold 4 is positioned at a tire transferring position B (refer to FIG. 8).

Subsequently, the second moving portion 73 moves the first support body 40 downward. Therefore, the first support body 40 is positioned at a waiting position C separately from the second support body 60 or the upper mold 4. The waiting position C may include a first waiting position C1 at which the first support body 40 is located above the carry-out device 32 (refer to FIG. 8) and a second waiting position C2 at which the first support body 40 is located below the carry-out device 32. The above mentioned positions will be explained below.

Figure 2:
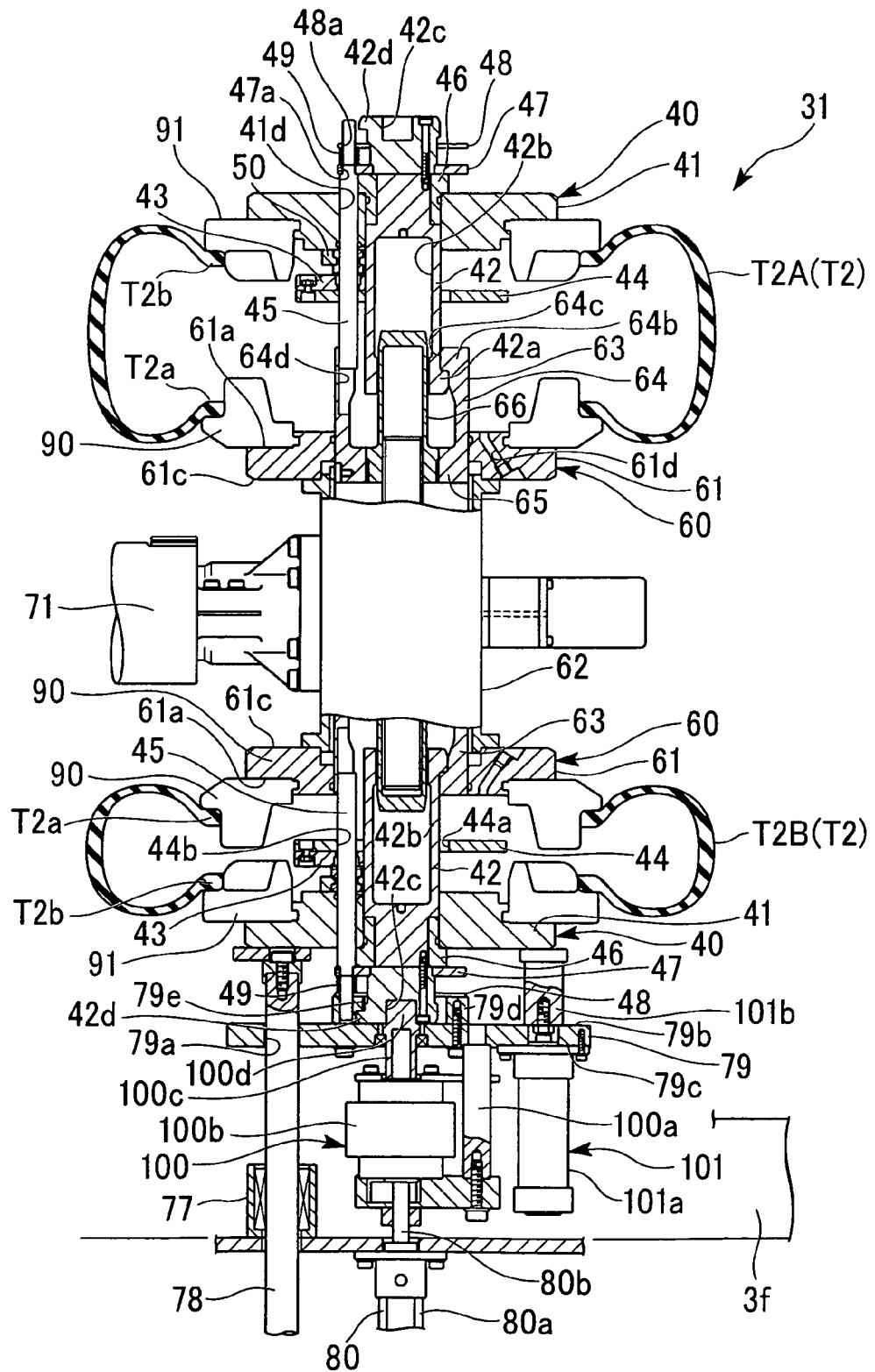
FIG. 2 is a sectional view showing the first and second support bodies of the tire holding mechanism included in the embodiment of the present invention.

As shown in FIG. 2, the second support bodies 60 are axisymmetrically fixed to the rotation body 71 via a cylindrical main body portion 62. The second support body 60 includes an engagement portion 63 disposed inside the main body portion 62, and the above mentioned second flange 61 fixed to the main body portion 62.

The engagement portion 63 includes an external cylindrical portion 64 and an internal cylindrical portion 66. The external cylindrical portion 64 is movable inside the main body portion 62 in an axial direction of the main body portion 62. The internal cylindrical portion 66 is inserted into the external cylindrical portion 64 through a bottom portion 65 of the external cylindrical portion 64. The engagement portion 63 can move in the axial direction of the main body portion 62 to adjust the position thereof with respect to the main body portion 62 using heretofore known arts (for example, refer to Japanese Patent No. 2670251). Therefore, the distance between the first flange 41 and the second flange 61 can be adjusted, and thereby vulcanized tires of different width sizes can be held.

The inner circumference surface of the external cylindrical portion 64 close to the distal end thereof is provided with three engagement projections 64b projecting inward the external cylindrical portion 64. Therefore, an opening 64c of the distal end of the external cylindrical portion 64 is formed in a substantially triangular shape. Grooves 64d are formed on the inner circumference surface of the external cylindrical portion 64 so as to extend in the axial direction of the external cylindrical portion 64. Guide shafts 45 which guide bead hooking pieces 43 of the first support body 40 are fitted to the grooves 64d.

The second flange 61 is formed in a substantially annular shape, and is fixed to the main body portion 62. The engagement portion 63 is inserted into the inside of the second flange 61 so as to be movable in the axial direction of the main body portion 62. The above mentioned inside rim 90 which supports the bead T2a of the vulcanized tire T2 is fixed to one surface 61a of the second flange 61. A supply path 61d is formed in the second flange 61 so as to pass through the second flange 61 from the surface 61a thereof to the other surface 61c. An opening of the supply path 61d at the surface 61a is located inside the inside rim 90. A supply device (not shown) which supplies gas inside the vulcanized tire T2 supported by the second flange 61 is connected to the supply path 61d.

Figure 3:
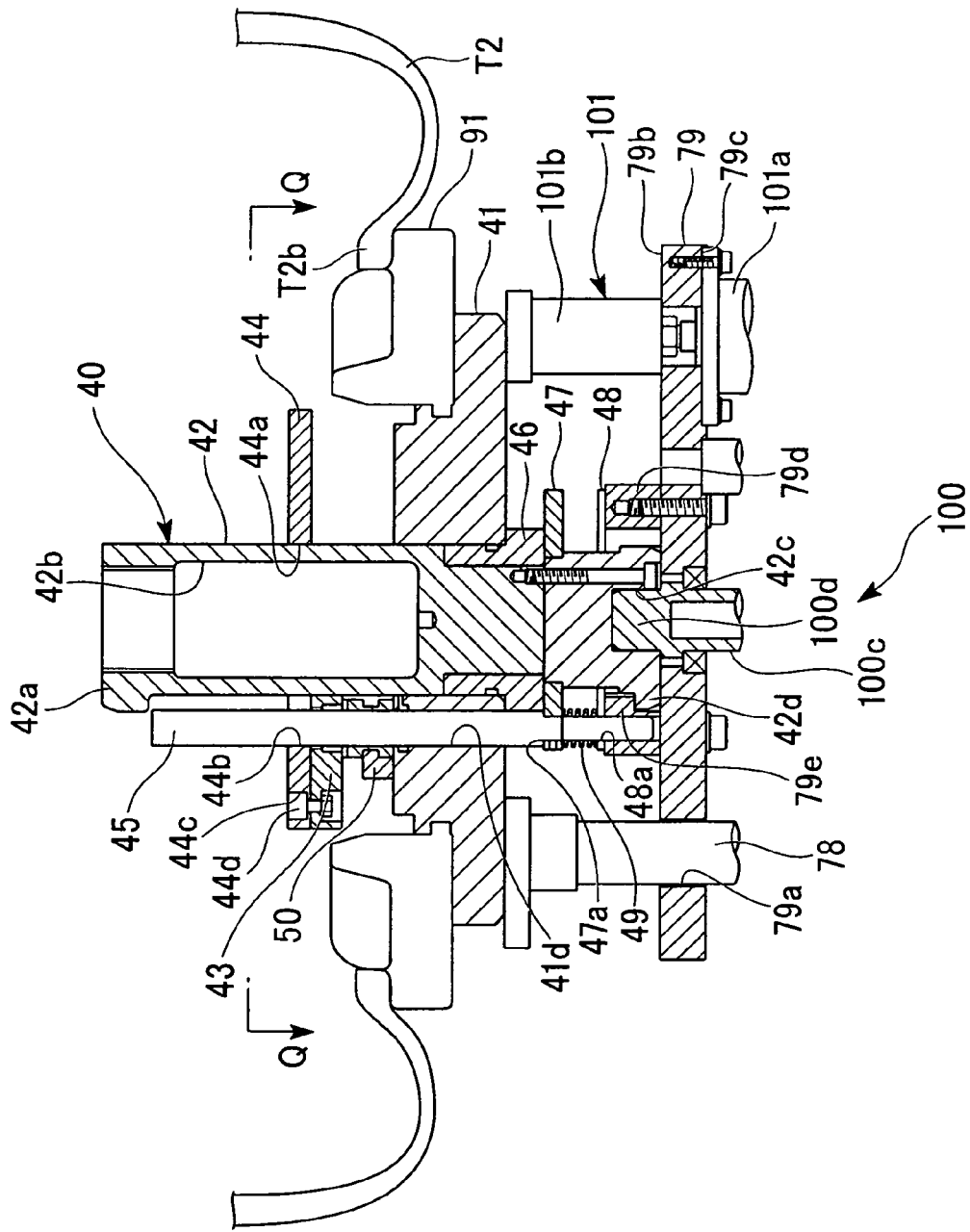
FIG. 3 is a sectional view taken along a line P-P in FIG. 4 showing the first support body of the tire holding mechanism included in the embodiment of the present invention.
Figure 4:
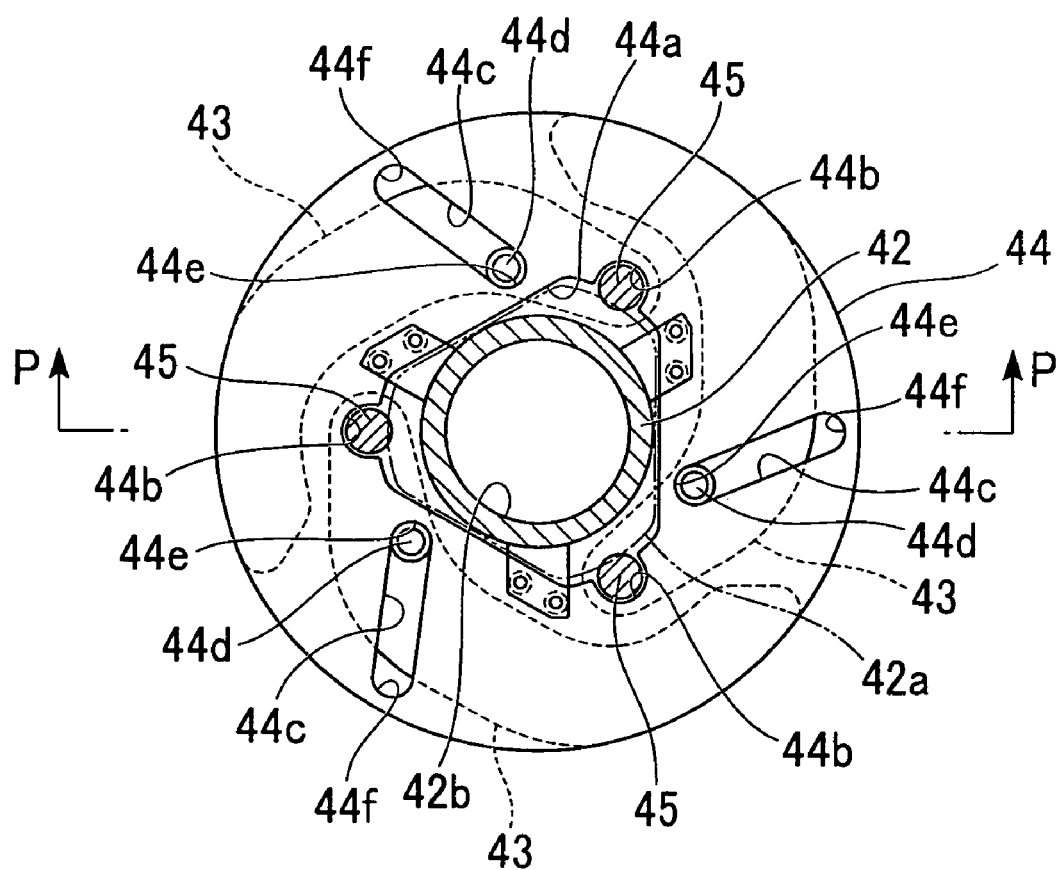
FIG. 4 is a sectional view taken along a line Q-Q in FIG. 3.

As shown in FIG. 2 to FIG. 4, each of the first support bodies 40 includes the first flange 41, a lock shaft 42, the three bead hooking pieces 43, a support disk 44 and the three guide shafts 45. The first flange 41 is formed in a substantially annular shape. The lock shaft 42 is inserted inside the first flange 41. The above mentioned outside rim 91 which supports the bead T2b of the vulcanized tire T2 is fixed to one surface of the first flange 41. The first flange 41 is movable with respect to the lock shaft 42 in an axial direction of the lock shaft 42. The bead hooking pieces 43 hook the bead T2b of the vulcanized tire T2 supported by the outside rim 91. The support disk 44 supports the bead hooking pieces 43. The guide shafts 45 are arranged around the lock shaft 42 so as to be at even intervals in the circumference direction of the lock shaft 42. While joining the first support body 40 with the second support body 60, the guide shafts 45 are fitted to the grooves 64d of the external cylindrical portion 64 included in the engagement portion 63 to guide the first flange 41, and the bead hooking pieces 43 and the support disk 44 in the axial direction of the main body portion 62.

The lock shaft is formed in a substantially columnar shape, and is insertable into the opening 64c of the external cylindrical portion 64. In a condition that the lock shaft 42 is inserted into the opening 64c, an axis of the lock shaft 42 is aligned with an axis of the second support body 60. lock projections 42a as a lock mechanism are formed at the distal end of the lock shaft 42 so as to project outward of the radial direction of the lock shaft 42. Therefore, the distal end portion of the lock shaft 42 is formed in a substantially triangular shape corresponding to the shape of the opening 64c. A hole 42b is formed in the proximal end of the lock shaft 42. When the lock shaft 42 inserted into the external cylindrical portion 64, the internal cylindrical portion 66 is inserted into the hole 42b for guiding the lock shaft 42. A substantially annular stopper 46 is fixed at the outer circumference surface of the lock shaft 42. The stopper 46 protrudes from the outer circumference surface of the lock shaft 42, and is allowed to hook the first flange 41. A square recessed portion 42c is formed in the proximal end of the lock shaft 42. A driving shaft 100c of the switching device 100 is allowed to fit to the recessed portion 42c.

An engagement flange 47 protruding outward in the radial direction of the lock shaft 42 is fixed to the outer circumference surface of the lock shaft 42 closer to the proximal end thereof than the stopper 46. In addition, a ring member 48 being movable in the axial direction of the lock shaft 42 is attached to the outer circumference surface of the lock shaft 42 closer to the proximal end thereof than the engagement flange 47. An engagement projection portion 42d protruding outward in the radial direction of the lock shaft 42 is provided at the distal end of the lock shaft 42.

Three through-holes 41d are formed in the first flange 41, three through-holes 47a are formed in the engagement flange 47, and through-holes 48a are formed in the ring member 48. The through-holes 41d are respectively communicated with the through-holes 47a in the axial direction of the lock shaft 42, and also the through-holes 47a are respectively communicated with the through-holes 48a in the axial direction of the lock shaft 42. Each of the three guide shafts 45 is passed through the holes 41d, 47a and 48a which communicate with each other. The three guide shafts 45 are respectively inserted into these three holes. Each of the guide shafts 45 is fixed to the engagement flange 47, and the distal end of the guide shaft 45 is located closer to the proximal end thereof than the lock projections 42a. Each of the guide shafts 45 is provided with a spring member 49. The spring member 49 is sandwiched between the engagement flange 47 and the ring member 48, and pushes the engagement flange 47 and the ring member 48 in opposite directions along the guide shaft 45.

The support disk 44 is formed in a substantially annular shape, and has a through-hole 44a through which the lock shaft 42 is movably inserted in the axial direction of the lock shaft 42. The through-hole 44a is formed in a substantially triangular shape corresponding to the shape of the distal end of the lock shaft 42 having the lock projections 42a. Further, three through-holes 44b are formed in the support disk 44 so that the three guide shafts 45 are respectively inserted into the through-holes 44b. The through-holes 44b are respectively located at three corners of the through-hole 44a. Actually, the through-holes 44b are communicated with the through-holes 44a. The three bead hooking pieces 43 are located on the surface of the support disk 44 close to the proximal end of the lock shaft 42 so as to be at regular intervals in the circumference direction of the support disk 44. Three elongated holes 44c respectively corresponding to the bead hooking pieces 43 are formed in the support disk 44. These elongated holes 44c are located so as to be at regular intervals in the circumference direction of the support disk 44, and each of the elongated holes 44c is arranged between the through-holes 44b adjacent to each other. Each of the elongated holes 44c is formed in a manner that extends in an intersectional direction with respect to the tangentially direction of the support disk 44.

Figure 6:
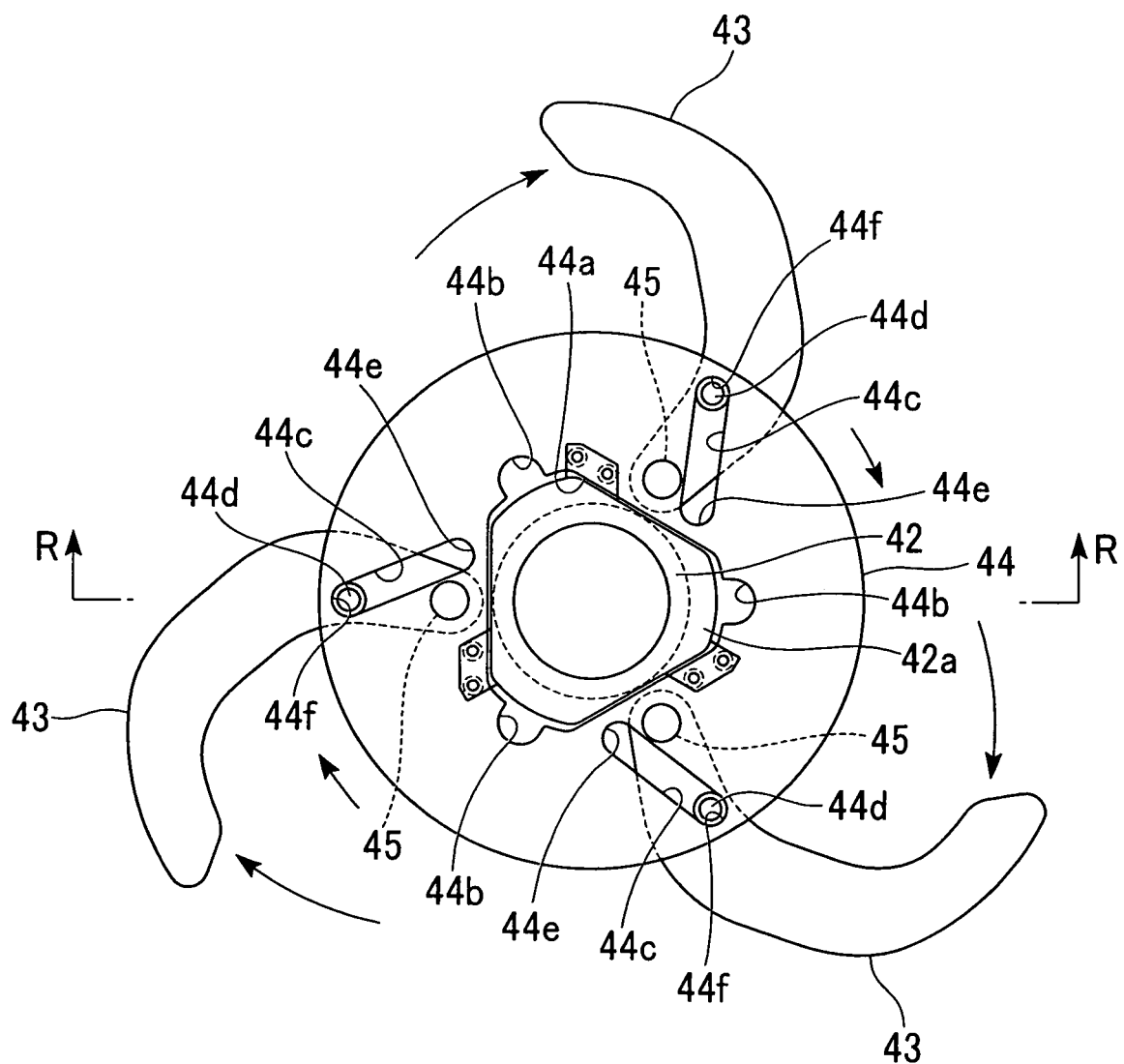
FIG. 6 is an upper plan view of the first support body of the tire holding mechanism included in the embodiment of the present invention, he first support body being located at the tire transferring position.

The proximal end of each of the bead hooking piece 43 is attached to the guide shaft 45 so that the bead hooking piece 43 is rotatable with respect to the guide shaft 45. The bead hooking piece 43 is provided with a slide shaft 44d at the middle portion thereof. The slide shaft 44d is engaged with the elongated hole 44c. When the support disk 44 is rotated in a predetermined direction with respect to the lock shaft 42, the slide shafts 44d are each moved inward in the radial direction of the support disk 44 along the elongated hole 44c, and thereby each of the bead hooking pieces 43 is swingy moved inward in the radial direction of the support disk 44 around the axis of the guide shaft 45. When the slide shaft 44d contacts an inside end 44e of the elongated hole 44c, the distal ends of the bead hooking pieces 43 are positioned inside of an outer edge of the support disk 44 as shown in FIG. 4 (that is "close condition"). In a view of the support disk 44 from above in the axial direction thereof, all of the bead hooking pieces 43 hide under the support disk 44. On the other hand, when the support disk 44 is rotated in the opposite direction of the predetermined direction with respect to the lock shaft 42, the slide shafts 44d are each moved outward in the radial direction of the support disk 44 along the elongated hole 44c, and thereby each of the bead hooking pieces 43 is swingy moved outward of the radial direction of the support disk 44 around the axis of the guide shaft 45. When the slide shaft 44d contacts an outside end 44f of the elongated hole 44c, the distal ends of the bead hooking pieces 43 are positioned outside of an outer edge of the support disk 44 as shown in FIG. 6 (that is "open condition"). As shown in FIG. 2 and FIG. 3, the engagement member 50 is fixed to the first flange 41, and is communicated with the bead hooking piece 43. Each of the bead hooking piece 43 is swingy movable around the guide shaft 45 by the engagement piece 45.

As shown in FIG. 2 and FIG. 3, the first support body 40 is connected to a connection surface 79b of the support plate 79. The support plate 79 is provided with the above mentioned switching device 100 and a shifting device 101. The switching device 100 rotates the lock shaft 42 to detachably attached the first support body 40 to the second support body 60. The shifting device 101 shifts the first flange 41 of the first support body 40 connected to the support plate 79 with respect to the support plate 79.

The switching device 100 includes a support frame 100a disposed at a surface 79c of the support plate 79 opposite to the connection surface 79b, and an actuator 100b mounted on the support frame 100a. A driving shaft 100c of the actuator 100b is located so that an axis thereof is aligned with that of the lock shaft 42, and is rotatably supported by a bearing provided on the support plate 79. The driving shaft 100c protrudes from the connection surface 79b, and the distal end of the driving shaft 100c is provided with a square head portion 100d which is allowed to be fitted to the recessed portion 42c of the lock shaft 42. The square head portion 100d is formed in a rectangular shape in a sectional surface perpendicular to an axial direction thereof.

The connection surface 79b of the support plate 79 is provided with an annular member 79d so as to be located around the square head portion 100d protruding from the connection surface 79b. The proximal end of the lock shaft 42 is insertable into a hole inside the annular member 79d. A projection portion 79e projecting inward in the radial direction of the annular member 79d is formed on the inner circumference surface of the annular member 79d. The proximal end of the lock shaft 42 of the first support body 40 is inserted inside the annular member 79d, the square head portion 100d of the driving shaft 100c is fitted to the recessed portion 42c of the lock shaft 42, the ring member 48 is pushed upward by the annular member 79d against a force of the spring member 49, and the projection portion 79e of the annular member 79d is engaged with the engagement projection portion 42d. Thereby, the first support body 40 is connected to the support plate 79.

In a condition that the first support body 40 is connected to the support plate 79, the lock shaft 42 is rotated via the driving shaft 100c by operating the actuator 100b of the switching device 100. The rotation of the lock shaft 42 enables to shift the position of the lock projections 42a of the first support body 40 with respect to the opening 64c of the engagement portion 63 of the second support body 60. The distal end of the lock shaft 42 provided with the lock projections 42a is fitted to the opening 64c, and thereby the lock shaft 42 can be inserted into the external cylindrical portion 64 of the engagement portion 63. Further, the lock shaft 42 are rotated while inserting the lock shaft 42 into the external cylindrical portion 64, the lock projections 42*a* are engaged with the engagement projections 64*b*, and thereby the first support body 40 can be joined with the second support body 60.

The shifting device 101 includes a cylinder 101*a* and a piston rod 101*b*. The cylinder 101*a* is disposed at a surface of the support plate 79 opposite to the connection surface 79*b*. The piston rod 101*b* protrudes from the connection surface 79*b* toward the first flange 41. The piston rod 101*b* of the shifting portion 101 is moved, the distal end of the piston rod 10*b* pushes the first flange 41. Therefore, the first flange 41 can be moved along the lock shaft 42.

The operation of the vulcanizer 1 and the tire holding mechanism 31 of the present embodiment will be explained below.

Figure 7:
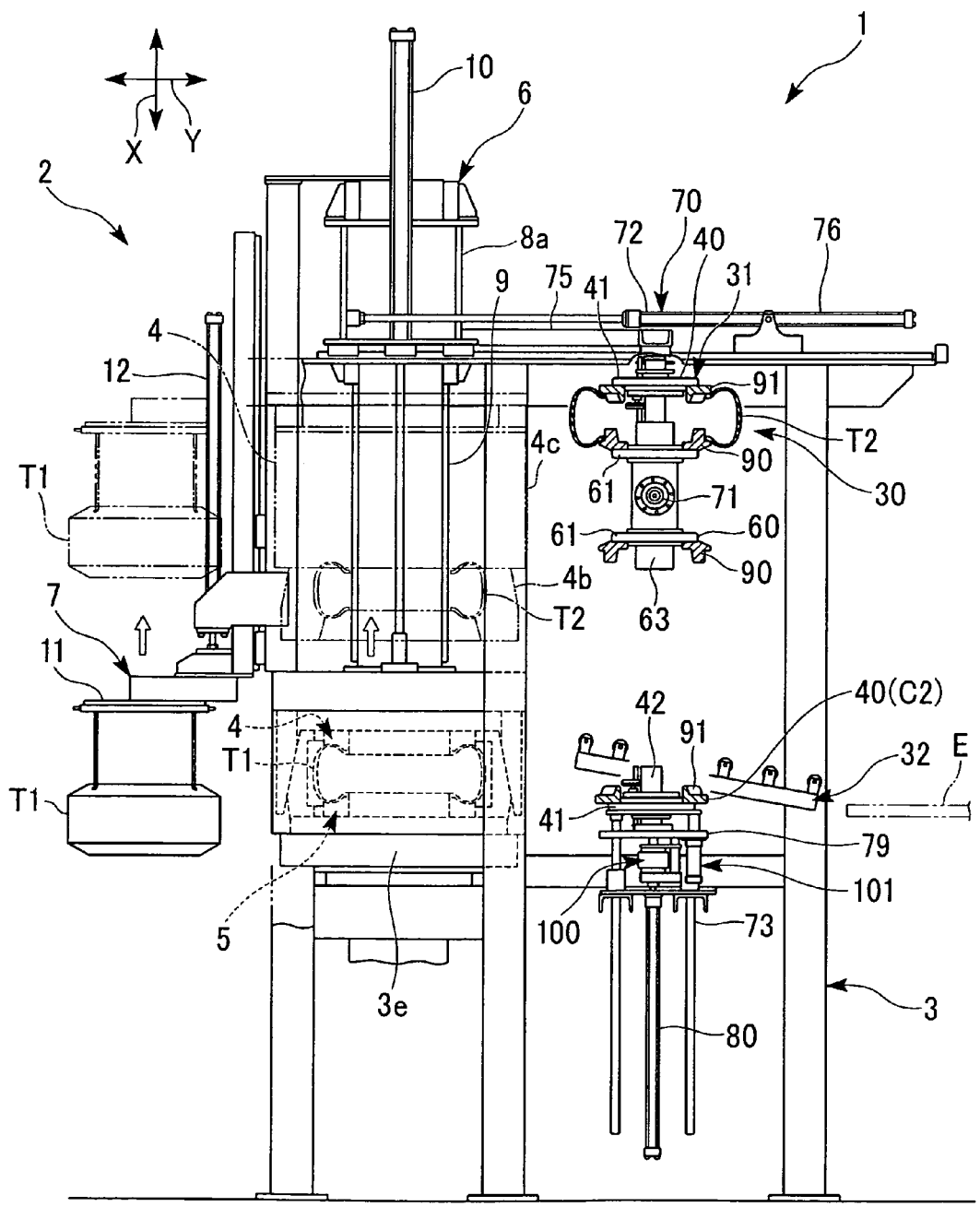
FIG. 7 is a view for explaining the vulcanization and inflation of the tire performed in the vulcanizer included in the embodiment of the present invention.

As shown in FIG. 7, the vulcanizer main body 2 of the vulcanizer 1 performs to vulcanize the unvulcanized tire T1 in the upper mold 4 and the lower mold 5. In the vulcanizer 1 of the present embodiment, the first and second bodies 40 and 60 perform to inflate the vulcanized tire T2 while vulcanizing the unvulcanized tire T1 by the vulcanizer main body 2. In a condition as shown in FIG. 7, one of the two first support bodies 40 which does not hold the vulcanized tire T2 is connected to the support plate 79, and is positioned at the second waiting position C2 separated from the second support body 60 corresponding to the first support body 40. Further, the unvulcanized tire T1 is carried in the vulcanizer main body 2 from the other equipments at a position adjacent to the upper and lower molds 4 and 5 using the carry-in device 7 of the vulcanizer main body 2. That is, the grasping portion 11 is moved downward by the tire elevation portion 12, and then the unvulcanized tire T1 is grasped by the grasping portion 11.

When the vulcanizing of the unvulcanized tire in the upper and lower molds 4 and 5 of the vulcanizer main body 2 is finished, the upper mold 4 is moved upward by the elevation device 6 while holding the vulcanized tire T2 in the upper mold 4. Therefore, the vulcanized tire T2 separates from the lower mold 5, and is moved upward with the upper mold 4. On the other hand, the unvulcanized tire T1 carried in the vulcanizer main body 2 from the other equipments while vulcanizing the other unvulcanizing tire in the upper and lower molds 4 and 5 is also moved upward with the upper mold 4 by moving upward the carry-in device 7 by the elevation device 6.

Figure 8:
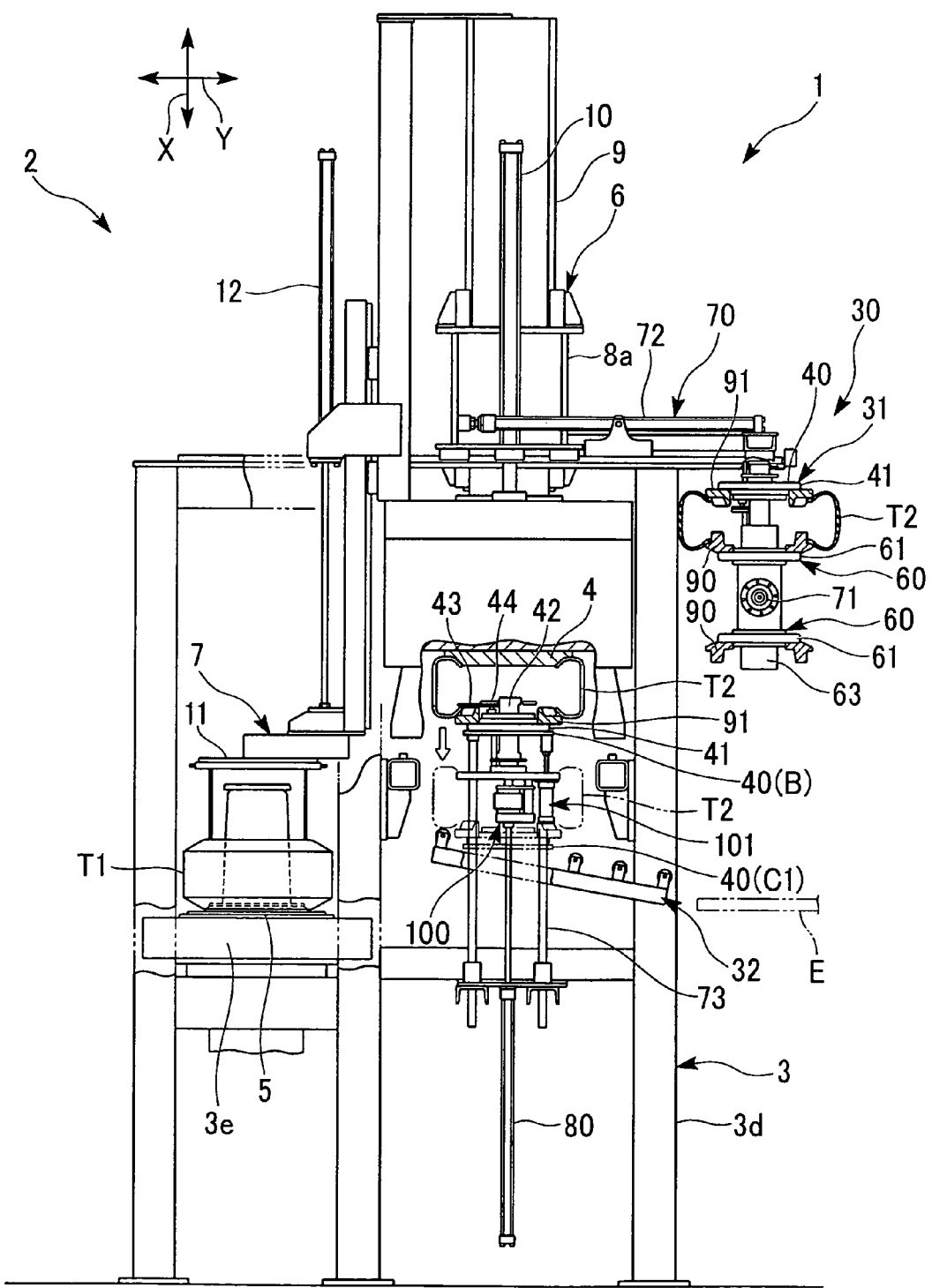
FIG. 8 is a view for explaining the carry-in operation of the unvulcanized tire to the lower mold and the inflation of the tire performed in the vulcanizer included in the embodiment of the present invention.
Figure 9:
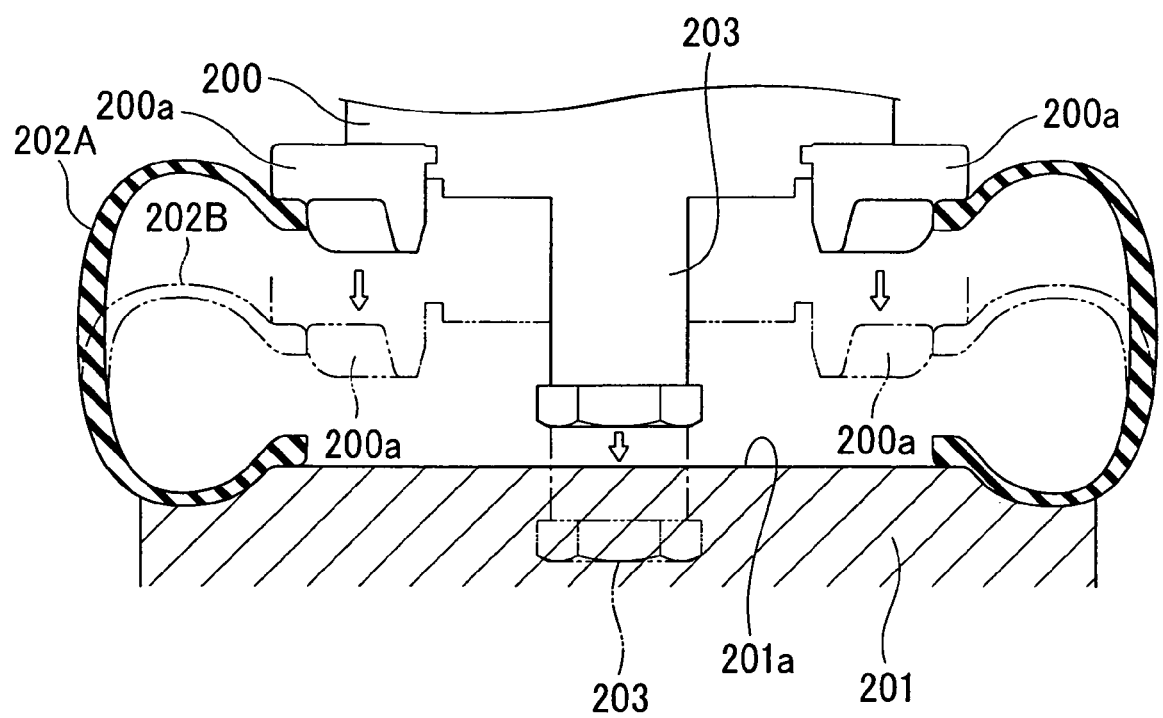
FIG. 9 is a view showing the conventional post cure inflator.

Then, the vulcanized tire T2 is transferred to the tire holding mechanism 31 of the PCI 30 by operating of the moving device 70. As shown in FIG. 8, the upper mold 4 and the vulcanized tire T2 accommodated in the upper mold 4 are moved in the horizontal direction Y to a position that the vulcanized tire T2 faces the first support body 40 by the first moving portion 72 of the moving device 70. The second support body 60 is moved outside the vulcanizer 1 close to the post member 3*b* with moving of the upper mold 4. Then, the first support body 40 is moved upward by the second moving portion 73. At this time, the bead hooking pieces 43 are positioned inside of an outer edge of the support disk 44 as shown in FIG. 4 (that is "close condition").

Figure 5:
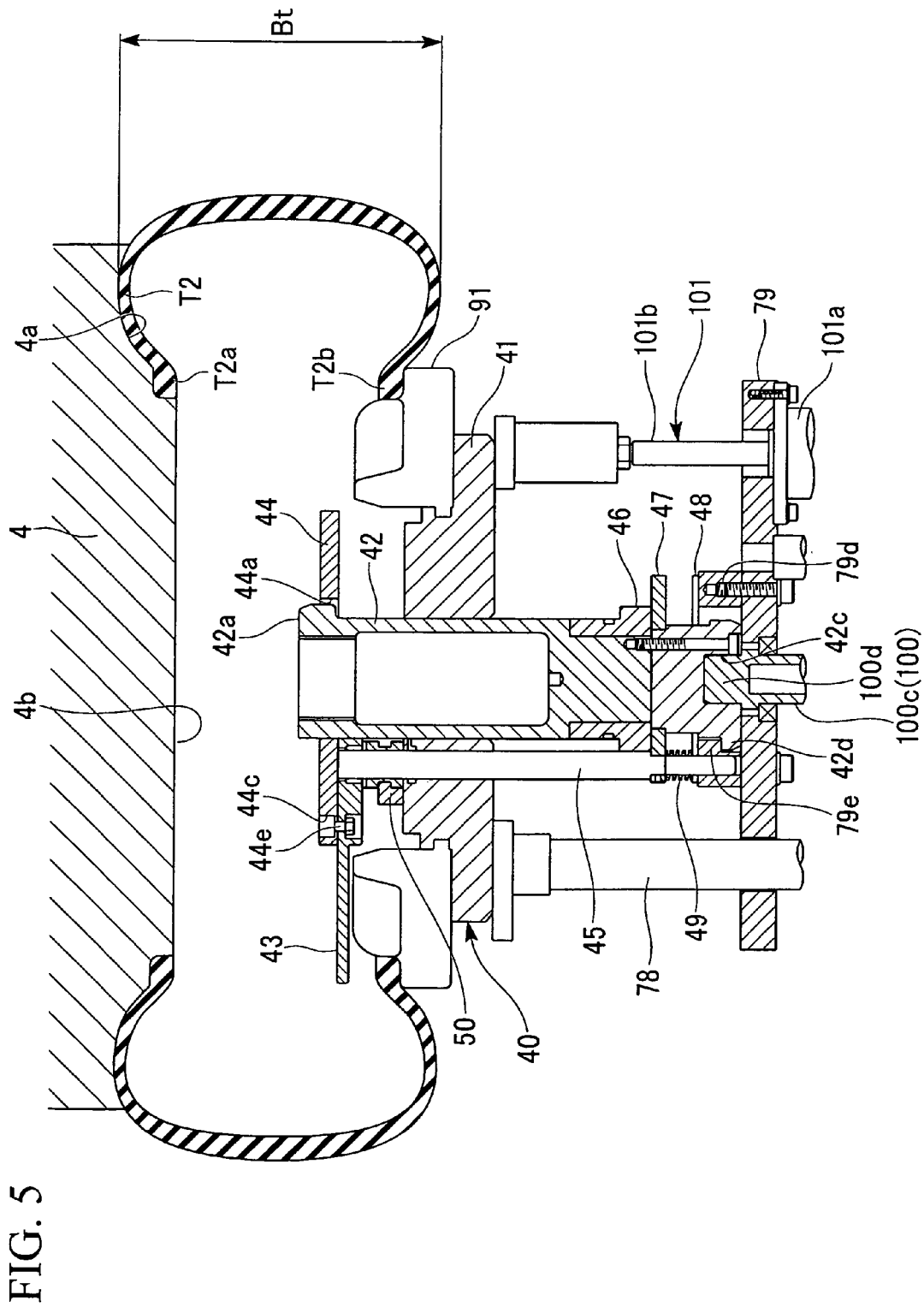
FIG. 5 is a sectional view taken along a line R-R in FIG. 6 showing the first support body of the tire holding mechanism included in the embodiment of the present invention, the first support body being located at the tire transferring position.

The piston rod 101*b* is protruded by operating the shifting device 101, and thereby the first flange 41 is moved from the condition that the first flange 41 is engaged with the stopper 46 (refer to FIG. 3) toward the distal end of the lock shaft 42 (refer to FIG. 5). Further, the lock projections 42*a* of the lock shaft 42 are fitted to the through-hole 44*a* of the support disk 42.

Therefore, the length of the distal end portion of the lock shaft 42 protruding from the first flange 41 can be maintained to the minimum. In addition, the support disk 44 joined with the lock shaft 42 can be rotated around the axis of the lock shaft 42.

The first support body 40 is moved upward by the second moving portion 73 while the above condition is maintained, only a part of the distal end portion of the lock shaft 42 is led toward the center of the vulcanized tire T2 in the upper mold 4, and the outside rim 91 fixed to the first flange 41 contacts the bead T2*b*. Therefore, the first support body 40 is positioned at a tire receiving position B in which the first support body 40 can receive the vulcanized tire T2. The length of the distal end portion of the lock shaft 42 protruding from the first flange 41 is maintained to the minimum. As shown in FIG. 5, even if the outside rim 91 contacts the bead T2*b* of the vulcanized tire T2, the distal end of the lock shaft 42 is positioned inside the vulcanized tire T2 regardless of the size of a width Bt of the vulcanized tire T2. Therefore, the distal end of the lock shaft 42 does not contact the a surface 4*b* of a cavity 4*a* formed in the upper mold 4, and also does not contacts a device (not shown) located above the distal end of the lock shaft 42. As a result, the first support body 40 can reliably support the vulcanized tire T2 by the outside rim 91 fixed to the first flange 41.

When the upper mold 4 is moved in the horizontal direction Y to the position that the upper mold 4 faces the first support body 40, the carry-in device 7 is also moved in the horizontal direction Y with the upper mold 4. Thus, the unvulcanized tire T1 carried in the vulcanizer 1 from the other equipments is positioned above the lower mold 5 supported by the frame set 3. Therefore, the unvulcanized tire T1 can be carried in the vulcanizer main body 2 without interference of the upper mold 4 while transferring the vulcanized tire T2 to the PCI 30. Further, the unvulcanized tire T1 can be positioned in the lower mold 5 by moving downward the unvulcanized tire T1 grasped by the grasping portion 11.

Next, the lock shaft 42 is rotated via the driving shaft 100*c* by operating the actuator 100*b* of the switching device 100. At this time, the lock projections 42*a* of the lock shaft 42 are fitted to the through-hole 44*a* of the support disk 44, and the support disk 44 is moved to the position that the lock projections 42*a* are fitted to the support disk 44. Thus, the distal ends of the guide shafts 45 are already removed from the through-holes 44*b*. Therefore, the support disk 44 is also rotated with the lock shaft 42. The support disk 44 is rotated around the axis thereof at a predetermined angle (for example, substantially 60° in the present embodiment) by the switching device 100, and thereby the each of the slide shafts 44*d* is moved from the inside end 44*e* of the elongated hole 44*c* to the outside end 44*f* along the elongated hole 44*c*. Each of the bead hooking piece 43 connected to the support disk 44 via the slide shafts 44*d* is rotated around the guide shaft 45, and the distal ends of the bead hooking pieces 43 are positioned outside of an outer edge of the support disk 44 (that is "open condition").

Then, the first support body 40 is moved downward to separate from the upper mold 4 by the second moving portion 73 of the moving device 70, and thereby the bead hooking pieces are hooked on the bead T2*b*. The vulcanized tire T2 is drawn downward from the upper mold 4 with the first support body 40, and is transferred to the first support body 40. In addition, as shown in FIG. 8, the first support body 40 is moved downward to a first waiting position C1 in which the first support body 40 does not interfere with the upper mold 4.

Then, the vulcanized tire T2 is held between the first and second flanges 41 and 61 by connecting the first support body 40 to the second support body 60, and thereafter the vulcanized tire T2 is inflated. In the second support body 60, the length of the engagement portion 63 protruding from the main body portion 62 is adjusted so as to correspond to the width Bt of the vulcanized tire T2 in advance. Further, the rotation body 71 is rotated so that one of the second support bodies 60 which does not hold the vulcanized tire T2 is positioned on the downside.

The second support body 60 is moved in the horizontal direction Y to a position that the second support body 60 faces the first support body 40 by the first moving portion 72 of the moving device 70. Then, the first support body 40 is moved upward by the second moving portion 73. At this time, the support disk 44 is rotated via the lock shaft 42, and thereby the bead hooking pieces 43 are positioned inside of an outer edge of the support disk 44 (that is "close condition"). Further, the piston rod 101b of the shifting device 101 is retracted, and thereby the support disk 44 is moved toward the proximal end of the lock shaft 42 to remove the lock projections 42a of the lock shaft 42 from the through-hole 44a of the support disk 44. It is unnecessary for the support disk 44 to be moved to a position so that the support disk 44 is engaged with the stopper 46. It is required for the lock projections 42a to be removed from the through-hole 44a. Detailed explanations will be provide below.

The first support body 40 is moved to the tire holding position A at which the first support body 40 is allowed to connect to the second support body 60 located above by the second moving portion 73. Therefore, the distal end of the lock shaft 42 of the first support body 40 is inserted inside the external cylindrical portion 64 of the engagement portion 63 included in the second support body 60 as shown in FIG. 1 and FIG. 2. In a condition that the distal end of the lock shaft 42 is inserted inside the external cylindrical portion 64 of the engagement portion 63, the lock shaft 42 is rotated, and thereby the lock projections 42a of the lock shaft 42 are engaged with the engagement projections 64b of the engagement portion 63, and the first support body 40 is joined with the second support body 60. Therefore, the vulcanized tire T2 is reliably held between the first and second flanges 41 and 61. Then, pressurized gas is supplied to the inside of the vulcanized tire T2 through the supply path 61d by the supply device (not shown). When the width of the vulcanized tire T2 expands with increasing inner pressure of the vulcanized tire T2, the first flange 41 is further pushed downward and is restrained by the stopper 46 reliably. Therefore, the first support body 40 is joined with the second support body 60 by the engagement of the lock projections 42a with the engagement projections 64b. The size of the width Bt of the vulcanized tire T2 is maintained so as to be equivalent to the distance between the first and second flanges 41 and 61 provided by the stopper 46 and the protruding length of the engagement portion 63 set in advance.

Generally, since the tire T2 after immediately vulcanizing is hot, the tire tends to easily deform. Therefore, the tire T2 may deform due to its weight, and thereby the distance between the beads T2a and T2b may be reduced compared with a desired dimension of the tire T2. However, in the present invention, since the first flange 41 is shifted closer to the distal end of the lock shaft 42 than the stopper 46 by the shifting device 101, the distance between the first and second flanges 41 and 61 is smaller than final distance between the beads T2a and T2b. Therefore, the vulcanized tire T2 reliably contacts the outside rim 91 fixed to the first flange 41 and the inside rim 90 fixed to the second flange 61 regardless of the size of the width of the tire before cooling. Therefore, there is no leak of gas from a contact portion of the bead T2b and the outside rim 91, and also there is no leak of gas from another contact portion of the bead T2a and the inside rim 90. As a result, pressurized gas can be supplied to the inside of the vulcanized tire T2 reliably. In addition, the vulcanized tire T2 supplied with pressurized gas is formed so that the width Bt of the tire T2 is equivalent to the desired dimension thereof.

When the vulcanized tire T2 supplied with pressurized gas is cooled, the support plate 79 is moved downward by the second moving portion 73 without operation of the switching device 100. Since the first support body 40 is joined with the second support body 60, only the support plate 79 is separated from the first support body 40 and is moved downward. After the cooling of the tire T2 is finished, the rotation body 71 is rotated, and thereby the vulcanized tire T2 already cooled is positioned below. Then, the support plate 79 is moved upward by the second moving portion 73, and is connected to the first support body 40. After the lock projections 42a are allowed to remove from the opening 64c of the engagement portion 63 by rotating the lock shaft 42 of the switching device 100, the support plate 79 is moved downward by the second moving portion 73 again. The first support body 40 is moved downward with the support plate 79. Also, the vulcanized tire T2 held by the first support body 40 is separated from the second support body 60 and is moved downward. When the first support body 40 is moved downward to the second waiting position C2, only the vulcanized tire T2 is put on the carry-out device 32. The vulcanized tire T2 is carried out from the vulcanizer 1.

When the vulcanized tire T2, the first support body 40 and the support plate 79 are moved downward by the second moving portion 73, it may be such that the vulcanized tire T2, the first support body 40 and the support plate 79 be moved downward to the first waiting position C1 while the bead hooking pieces 43 are swingy moved outward (that is "open condition"), and then the first support body 40 and the support plate 79 be moved downward to the first waiting position C1 be moved downward to the second waiting position C2 after swingy moving the bead hooking pieces 43 inward (that is "close condition").

In the inflation, the PCI 30 is not moved in the horizontal direction Y by the first moving portion 72 while the vulcanized tire T2 is held by the tire holding mechanism 31 of the PCI 30, and then is carried out. Therefore, an unvulcanized tire T1 subsequently carried in the vulcanizer main body 2 is vulcanized together with the inflation by the PCI 30.

The explanation regarding the vulcanizer 1, particularly the tire holding mechanism 31 included in the PCI 30 have been provided above. In the tire holding mechanism 31 of the present embodiment, the first flange 41 of the first support body 40 is movably supported along the lock shaft 42. Also, the first flange 41 can be moved by the shifting device 101, and can be restrained by the stopper 46. Therefore, in any sizes of the width of the vulcanized tire T2, the vulcanized tire T2 can be reliably received by the first flange 41 without interference of the lock shaft 42. In addition, after receiving the vulcanized tire T2, the tire T2 can be reliably held while maintaining the desired width thereof.

Further, the tire holding mechanism 31 performs to join the first support body 40 with the second support body 60, and to remove the first support body 40 from the second support body 60 using the switching device 100. As mentioned above, the rotation of the support disk 44 (that is, the movement of the bead hooking pieces 43 as hooking member) can be performed by adjusting the position of the support disk 44 using the shifting device 101. Therefore, it is unnecessary to provide any devices to move the bead hooking pieces 43, and it is possible to reliably receive the vulcanized tire T2 from the upper mold 4 using the bead hooking pieces 43. As a result, an area occupied by the mechanism can be reduced, and a reduction in cost can be achieved.

As mentioned above, in the vulcanizer 1 provided with the PCI 30 having the tire holding mechanism 31, since the tire holding mechanism 31 receives and holds the vulcanized tire T2, and then inflate the tire is inflated, it is unnecessary to provide any devices to carry the tire between the vulcanizer main body 2 and the PCI 30. Therefore, an area occupied by the vulcanizer can be reduced, and a reduction in cost can be achieved. Further, in the vulcanizer 1 of the present embodiment, the upper mold 4 can be moved in the vertical direction X by the elevation device 6, and can be moved in the horizontal direction Y by the moving device 70 of the tire holding mechanism 31. Furthermore, the carry-in device 7 for carrying the unvulcanized tire T1 can be moved in the horizontal direction Y by the moving device 70. Therefore, the process for carrying the unvulcanized tire to the lower mold 5 and the process for transferring the vulcanized tire from the upper mold 4 to the first support body 40 can be simultaneously performed without interfering each other. As a result, a cycle time of the processes can be reduced. Even if the lower mold 5 is not moved, the position of elements can be easily adjusted with high accuracy on the basis of the upper mold 5. The upper mold 4, the carry-in device 7, and the first support body 40 and the second support body 60 can be moved in the vertical direction X and in the horizontal direction Y without moving the lower mold 5. Therefore, spaces in the vulcanizer can be effectively utilized. That is, with the advantage in which there is no carrying device between the vulcanizer main body 2 and the PCI 30, an area occupied by the vulcanizer can be further reduced.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In this embodiment, the tire holding mechanism 31 forms a part of the PCI 30. It may be such that the tire holding mechanism 31 receive the tire from the other equipments and hold it, such that the tire holding mechanism 31 transfer the tire to the other equipments. In this case, the length of the distal end of the lock shaft 42 protruding from the first flange 41 is reduced, and thereby the tire can be transferred without interference of external devices. Further, in the tire holding mechanism 31 of the present embodiment, the first support body 40 is provided with the bead hooking pieces 43 as the hooking member. However, if the vulcanized tire T2 can be separated from the upper mold 4, it is unnecessary to provide the first support body 40 with the bead hooking pieces 43. Any devices for drawing the vulcanized tire T2 from the upper mold 4 may be provided separately from the first support body 40, or the devices may be provided to the upper mold 4.

What is claimed is:
1. A tire holding mechanism which holds a tire and which transfers the tire to/from other equipments, the tire holding mechanism comprising:
a first support body provided with a substantially annular first flange which supports a first bead at one side of the tire, a lock shaft having a lock mechanism and which protrudes in an axial direction of the first flange to allow the first flange to move in the axial direction of the first flange, and a stopper which restrains the first flange at a proximal end of the lock shaft;
a second support body provided with a substantially annular second flange which supports a second bead at the other side of the tire, and an engagement portion with which the lock mechanism is removably engaged;
a main body portion which supports the second support body;
a moving device which moves the first support body between a tire holding position and a tire transferring position; and
a shifting device which shifts the first flange with respect to the lock shaft in the axial direction of the first flange,
wherein the engagement portion is movable in an axial direction of the main body portion to adjust a position thereof with respect to the main body portion,
the lock mechanism is engaged with the engagement portion at the tire holding position, and
the shifting device shifts the first flange toward a distal end of the lock shaft while transferring the tire to/from the other equipments.
2. The tire holding mechanism according to claim 1, wherein
the first support body is provided with hooking members so that the hooking members are located closer to the distal end of the lock shaft than the first flange, and
the hooking members are movable in a radial direction of the lock shaft to hook the tire with the first flange.
3. The tire holding mechanism according to claim 2, further comprising an engagement switching device which allows the lock mechanism to engage with the engagement portion,
wherein the hooking members are moved in the radial direction of the lock shaft by the engagement switching device.
4. The tire holding mechanism according to claim 1, wherein the engagement portion is telescopically movable with respect to the main body portion.
5. The tire holding mechanism according to claim 1, wherein the moving device includes
a first moving portion moving the second support body so that the second support body faces the first support body, and
a second moving portion moving the first support body upwardly so that the first support body is positioned at the tire holding position.
6. A post cure inflator comprising the tire holding mechanism according to claim 1, wherein the post cure inflator cools a vulcanized tire while holding the vulcanized tire between the first and second support bodies.

* * * * *